United States Patent
Matsumura

(10) Patent No.: US 11,528,381 B1
(45) Date of Patent: Dec. 13, 2022

(54) INFORMATION PROCESSING APPARATUS, SERVICE SYSTEM, AND NON-TRANSITORY COMPUTER READABLE MEDIUM FOR REGISTRATION MULTIPLE APPARATUSES TO USE A NEW SERVICE

(71) Applicant: FUJIFILM Business Innovation Corp., Tokyo (JP)

(72) Inventor: Ryoji Matsumura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/699,167

(22) Filed: Mar. 20, 2022

(30) Foreign Application Priority Data

Sep. 24, 2021 (JP) .............................. JP2021-155110

(51) Int. Cl.
*H04N 1/00* (2006.01)

(52) U.S. Cl.
CPC ....... *H04N 1/00973* (2013.01); *H04N 1/0097* (2013.01); *H04N 1/00244* (2013.01); *H04N 1/00344* (2013.01); *H04N 1/00413* (2013.01); *H04N 1/00938* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,686,147 B2 | 6/2017 | Hyo | |
| 2016/0224947 A1* | 8/2016 | Ishimaru | G06F 21/608 |
| 2017/0094079 A1* | 3/2017 | Watanabe | G06F 3/1238 |
| 2021/0274053 A1* | 9/2021 | Yano | H04N 1/00344 |
| 2021/0321009 A1* | 10/2021 | Sato | H04N 1/00952 |

FOREIGN PATENT DOCUMENTS

JP 6617808 12/2019

* cited by examiner

*Primary Examiner* — Henok Shiferaw
(74) *Attorney, Agent, or Firm* — JCIPRNET

(57) ABSTRACT

An information processing apparatus from which communication with one or multiple apparatuses held by a user is not allowed to be started includes: a processor configured to: in response to application for use of a service from the user, extract the multiple apparatuses held by the user, by referring to held-apparatus information in which the user is associated with the multiple apparatuses held by the user; register use start information in a storage area provided for each of the multiple extracted apparatuses, the use start information including at least apparatus registration information; and after recognizing that one of the apparatuses refers to the apparatus registration information, register an identification of the apparatus that refers to the apparatus registration information, the identification being registered in a memory storing an apparatus permitted the use of the service, the identification being registered in relation to an identification of the service.

13 Claims, 12 Drawing Sheets

FIG. 2

| CUSTOMER ID | MODEL ID | APPARATUS ID |
|---|---|---|
| C001 | M1001 | D10010101 |
| C001 | M1002 | D10020102 |
| C001 | M1002 | D10020103 |
| C002 | M1001 | D10010201 |
| C003 | M1004 | D10040301 |
| C003 | M1004 | D10040302 |
| C004 | M1001 | D10040401 |
| C004 | M1002 | D10020402 |
| C004 | M1003 | D10030403 |
| ⋮ | | |

FIG. 3

| SERVICE ID | APPLIED MODEL |
|---|---|
| service-z | M1001, M1002, M1003, M1004, M1008, M1009, ⋯ |
| service-y | M1002, M1003, M1004, M1011, M1021, M1031, ⋯ |
| service-x | M1001, M1002, M1003, M1004, M1005, M1006, ⋯ |
| ⋮ | |

FIG. 4

| SERVICE ID | APPARATUS ID |
|---|---|
| service-a | D10010101, D10010102, D10010103, ⋯ |
| service-b | D10010101, D10040301, D10040302, ⋯ |
| service-c | D10010101, D10010102, D10010103, ⋯ |
| ⋮ | |
| service-x | D10010101, D10010102, D10010103, ⋯ |
| ⋮ | |

FIG. 6

| APPARATUS ID | INSTRUCTION | URL | REGISTRATION CODE |
|---|---|---|---|
| D10010101 | REGISTER APPARATUS | https://service-x.a.com/regist | 163abc45 |
| D10020102 | REGISTER APPARATUS | https://service-x.a.com/regist | rjew582s |
| D10020103 | REGISTER APPARATUS | https://service-x.a.com/regist | 9302c1rj |

FIG. 9

| CUSTOMER ID | MODEL ID | APPARATUS ID | ADDRESS INFORMATION |
|---|---|---|---|
| C001 | M1001 | D10010101 | 111.222.111.1 |
| C001 | M1002 | D10020102 | 111.222.111.2 |
| C001 | M1002 | D10020103 | 111.222.111.3 |
| C002 | M1001 | D10010201 | 123.456.789.1 |
| C003 | M1004 | D10040301 | dev1.aaa.bbb.com |
| C003 | M1004 | D10040302 | dev2.aaa.bbb.com |
| C004 | M1001 | D10040401 | 135.246.791.1 |
| C004 | M1002 | D10020402 | 135.246.791.2 |
| C004 | M1003 | D10030403 | 135.246.791.3 |
| ⋮ | | | |

INFORMATION PROCESSING APPARATUS, SERVICE SYSTEM, AND NON-TRANSITORY COMPUTER READABLE MEDIUM FOR REGISTRATION MULTIPLE APPARATUSES TO USE A NEW SERVICE

CROSS-REFERENCE TO RELATED APPLICATIONS

This application is based on and claims priority under 35 USC 119 from Japanese Patent Application No. 2021-155110 filed Sep. 24, 2021.

BACKGROUND

(i) Technical Field

The present disclosure relates to an information processing apparatus, a service system, and a non-transitory computer readable medium.

(ii) Related Art

Service providers which install an apparatus in the facility of a customer to provide services related to the apparatus intend to give an instruction to the apparatus on occasions. In this case, if each service provider is able to start communications with the apparatus, the service provider may access the apparatus to directly give an instruction without any trouble. However, a service provider is possibly not allowed to start communications with the apparatus, depending on the specification such as a hardware environment. In this case, it is not possible for the service provider to directly take an action on the apparatus. A conceivable method for addressing such a case is using polling.

Specifically, if the service provider intends to give an instruction to the apparatus, the service provider registers information indicating the instruction in a predetermined storage area. The apparatus performs polling and thus refers to the predetermined storage area provided in the service provider. If some information is registered, the apparatus reads out the information and executes a process in accordance with the read out information. The service provider may give an instruction to the apparatus in this manner.

If a customer has multiple apparatuses, there is a case where the customer intends to start using a new service of services provided by the service provider. As described above, if communications with the apparatuses are not allowed to be started from the service provider, an administrator for the apparatuses in the user company applies to the service provider for new use of the service and operates each apparatus to newly use the service.

In more detailed description, if each apparatus is a multifunction printer (MFP), the administrator moves to the place where the MFP is installed and operates the MFP to display a predetermined service screen on the operation panel. This operation causes a button for declaring the start of using the service to be displayed on the operation panel, and thus the administrator selects the button. The MFP notifies the service provider of the start of using the service selected in accordance with the selection operation. The service provider receives the notification from the MFP and registers, in a database for managing the MFPs, information in which the MFP as the notification source is related to the selected service. An intended service may thereby be used from the MFPs held by the user. (For example, Japanese Patent No. 6617808.)

SUMMARY

Suppose a case where communications with apparatuses held by a user are not allowed to be started from an information processing apparatus and where information required to use a new service is registered in the information processing apparatus to enable the apparatuses to use the service. To date, this case requires such work that the administrator or the like in the user moves to the installation place of each apparatus and performs a predetermined operation of the apparatus, as described above. The more apparatuses the user holds, the greater burden the work carries.

Aspects of non-limiting embodiments of the present disclosure relate to reducing burden on a user in performing registration work for registering information required to cause multiple apparatuses held by the user to use a new service if communications with apparatuses held by the user are not allowed to be started from the information processing apparatus, as compared with a case where the user performs the registration work on each of the multiple apparatuses.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus from which communication with one or multiple apparatuses held by a user is not allowed to be started, the information processing apparatus including: a processor configured to: in response to application for use of a service from the user, extract the multiple apparatuses held by the user, by referring to held-apparatus information in which the user is associated with the multiple apparatuses held by the user; register use start information in a storage area provided for each of the multiple extracted apparatuses, the use start information including at least apparatus registration information; and after recognizing that one of the apparatuses refers to the apparatus registration information, register an identification of the apparatus that refers to the apparatus registration information, the identification being registered in a memory storing an apparatus permitted the use of the service, the identification being registered in relation to an identification of the service.

BRIEF DESCRIPTION OF THE DRAWINGS

Exemplary embodiments of the present disclosure will be described in detail based on the following figures, wherein:

FIG. 2 is a table illustrating an example data structure of held-apparatus information stored in a held-apparatus information DB in Exemplary Embodiment 1;

FIG. 3 is a table illustrating an example data structure of applied-model information stored in an applied-model information memory in Exemplary Embodiment 1;

FIG. 4 is a table illustrating an example data structure of used-service information stored in a used-service information DB in Exemplary Embodiment 1;

FIG. 6 is a table illustrating an example data structure of instruction information kept in an instruction keeping unit in Exemplary Embodiment 1;

FIG. 9 is a table illustrating an example data structure of held-apparatus information stored in a held-apparatus information DB in Exemplary Embodiment 3;

DETAILED DESCRIPTION

Hereinafter, exemplary embodiments of the present disclosure will be described on the basis of the drawings.

Exemplary Embodiment 1

Figure 1:
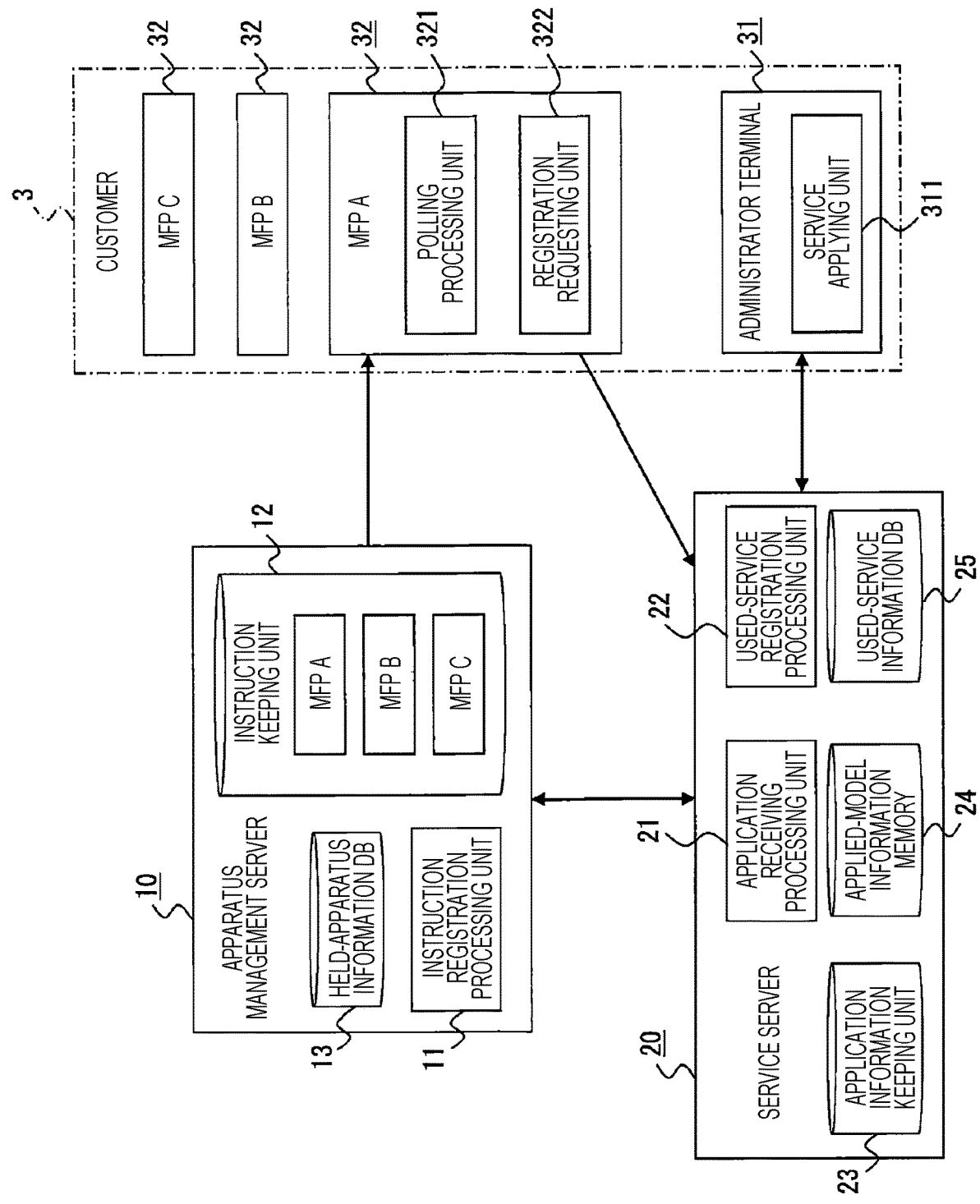
FIG. 1 is a block diagram illustrating the configuration of a service system in Exemplary Embodiment 1.

FIG. 1 is a block diagram of an exemplary embodiment of the configuration of a service system according to the present disclosure. FIG. 1 illustrates an apparatus management server 10, a service server 20, an administrator terminal 31 held by a customer 3, and MFPs 32. The apparatus management server 10 and service server 20 are installed in the site of a service provider which manages apparatuses held by the customer 3 and provides the customer 3 with services performed with the apparatuses. The service system in this exemplary embodiment uses the apparatus management server 10 to manage the MFPs 32 of the customer 3 and uses the service server 20 to manage services used by the MFPs 32 of the customer 3. Since the apparatuses and the services are managed in this exemplary embodiment, different servers are used to manage the apparatuses and the services; however, the apparatus management server 10 and the service server 20 may be integrated and thus configured as one information processing apparatus. The apparatus management server 10 and the service server 20 are assumed to be installed in a cloud system in consideration of accessibility from the customer 3. The apparatus management server 10 and the service server 20 are connected to each other to be able to perform communications via a network (not illustrated) such as the Internet.

For this exemplary embodiment, the MFPs 32 will be described taken as an example of apparatuses held by a user serving as the customer 3 of a service provider. Accordingly, in this exemplary embodiment, the terms "apparatus" and "MFP" are used with the same meaning. Although there may be multiple customers 3 who use the services provided by the service server 20, FIG. 1 illustrates only one customer 3 because processing may be performed in the equal manner for each customer 3 in this exemplary embodiment.

The apparatus management server 10 in this exemplary embodiment may be implemented by the hardware configuration of an existing general server computer. Specifically, the apparatus management server 10 includes a central processing unit (CPU), memories such as a read-only memory (ROM), a random-access memory (RAM), and a hard disk drive (HDD), a network interface, and other components. A user interface may be provided as needed.

The apparatus management server 10 includes an instruction registration processing unit 11, an instruction keeping unit 12, and a held-apparatus information database (DB) 13. Note that components not used in the description of this exemplary embodiment are omitted in FIG. 1. In response to service use application from the customer 3, the instruction registration processing unit 11 registers instruction information indicating an instruction given to one of the MFPs 32 in the instruction keeping unit 12.

FIG. 2 is a table illustrating an example data structure of the held-apparatus information stored in the held-apparatus information DB 13 in this exemplary embodiment. The held-apparatus information is information for managing the apparatuses held by the customer 3 that are the MFPs 32 in this exemplary embodiment. In the held-apparatus information, a customer identification (ID) is associated with a model ID and an apparatus ID of a MFP 32. As the customer ID, an identification identifying the customer 3 holding the apparatus is set. In this exemplary embodiment, a customer code assigned to the customer 3 is used as the customer ID. As the model ID, information for identifying the model of the apparatus is set. The model ID may be a model name, a model code, or the like. As the apparatus ID, information for identifying the apparatus is set. The apparatus ID may be the name of the apparatus, an apparatus code, a manufacturing number, or the like. The MFPs 32 having the same model ID are installed in the facility of one customer 3 in some cases but have respective different apparatus IDs despite the same model ID.

Storage areas are prepared in the instruction keeping unit 12 for the respective MFPs 32 and each store instruction information addressed to the corresponding MFP 32. It goes without saying that if a MFP 32 serving as the destination of the information may be identified by using a file name or the like registered in the storage area, in other words, if each MFP 32 may identify instruction information addressed to the MFP 32, a storage area shared by the multiple MFPs 32 may be provided. The data structure of the instruction information registered in the instruction keeping unit 12 will be described later together with operations of the apparatus management server 10, the service server 20, and the MFPs 32.

The instruction registration processing unit 11 of the apparatus management server 10 is implemented by cooperative operations between a computer configured as the apparatus management server 10 and a program run by the CPU included in the computer. The instruction keeping unit 12 and the held-apparatus information DB 13 are each implemented by a HDD included in the apparatus management server 10. Alternatively, a RAM or an external memory may be used via the network.

The service server 20 may be implemented by using the hardware configuration of an existing general server computer, like the apparatus management server 10. The service server 20 includes an application receiving processing unit 21, a used-service registration processing unit 22, an application information keeping unit 23, an applied-model information memory 24, and a used-service information DB 25. Components not used in the description of this exemplary embodiment are omitted in FIG. 1.

The application receiving processing unit 21 receives service use application from the customer 3. The used-service registration processing unit 22 registers information required for the used-service information DB 25 in response to an information registration request from a MFP 32 to use a service.

FIG. 3 is a table illustrating an example data structure of applied-model information stored in the applied-model information memory 24 in this exemplary embodiment. The applied-model information is information for identifying the model of a MFP 32 to which a service provided for the customer 3 by the service server 20 is applicable. In the applied-model information, the model ID of the MFP 32 to which the service is applicable is set in association with a service identification (hereinafter, referred to as a service ID) identifying a service.

FIG. 4 is a table illustrating an example data structure of used-service information stored in the used-service information DB 25 in this exemplary embodiment. The used-service information is information for identifying an MFP 32 permitted to use a service provided by the service server 20. In the used-service information, the apparatus ID of the MFP 32 permitted to use the service is set in association with a service ID identifying the service.

The application information keeping unit 23 temporarily keeps application information generated in response to the service use application from the customer 3. The data structure of the application information stored in the application information keeping unit 23 will be described later together with the operations of the apparatus management server 10, the service server 20, and the MFPs 32.

The application receiving processing unit 21 and the used-service registration processing unit 22 of the service server 20 are implemented by cooperative operations between a computer configured as the service server 20 and a program run by the CPU included in the computer. The application information keeping unit 23, the applied-model information memory 24, and the used-service information DB 25 are implemented by using the HDD included in the service server 20. Alternatively, the RAM or an external memory may be used via the network.

The administrator terminal 31 and the MFPs 32 are installed in the facility of the customer 3. The customer 3 is a company that is a user of the service system and that generally uses the MFPs 32 for business. The administrator terminal 31 is a terminal apparatus used by an administrator for the MFPs 32 in the customer 3. It suffices that the customer 3 holds at least one MFP 32, but holding more MFPs 32 in the facility provides noticeable effects in this exemplary embodiment. Although FIG. 1 illustrates an example in which the customer 3 holds three MFPs 32, the number of held MFPs is not limited to this number. Each MFP 32 has an equal function, and thus FIG. 1 illustrates the functional blocks of only one MFP 32. The term "MFP 32" is used in the description of a function common to the MFPs 32, while the terms "MFP A", "MFP B", and "MFP C" illustrated in FIG. 1 are used to identify the respective MFPs 32 in the description of the individual MFPs 32. Since a person appearing in the customer 3 is only the administrator in the description of this exemplary embodiment, the customer 3 and the administrator are used with the same meaning on occasions.

The administrator terminal 31 is implemented by an existing a personal computer or the like. Specifically, the administrator terminal 31 includes a CPU, a ROM, a RAM, a HDD, a user interface such as a mouse, a keyboard, or a display, a network interface, and other components.

The administrator terminal 31 has a service applying unit 311. Components not used in the description of this exemplary embodiment are omitted in FIG. 1. To cause a MFP 32 to newly start using a service not used at present of services provided by the service server 20, the service applying unit 311 applies to the service server 20 for starting using the service not used at present. The term "service not used at present" denotes a service that has not been used in the past or a service that has been used in the past but is stopped from being used at present. The service applying unit 311 of the administrator terminal 31 is implemented by cooperative operations between a computer configured as the administrator terminal 31 and a program run by the CPU included in the computer.

Each MFP 32 takes the form of an image forming apparatus having functions such as a printing function, a copying function, and a scanning function and is an apparatus having a computer incorporated therein. Specifically, the MFP 32 has a CPU, a ROM, a RAM, a HDD, an operation panel, a network interface, and other components. The MFP 32 includes a scanner and a printer to provide multiple functions and also includes a device such as a stapler or a finisher depending on the model.

The MFP 32 includes a polling processing unit 321 and a registration requesting unit 322. Components not used in the description of this exemplary embodiment are omitted in FIG. 1. The polling processing unit 321 performs polling and thereby verifies whether information addressed to the MFP 32 is registered in a predetermined storage area provided for the MFP 32 in the instruction keeping unit 12 of the apparatus management server 10. If the information addressed to the MFP 32 is registered, the polling processing unit 321 extracts the information. The term "polling" used in this exemplary embodiment denotes a process executed by the MFP 32 because accessing the MFP 32 is not allowed to be started from the apparatus management server 10. The polling is a method for verifying whether there is an instruction from the apparatus management server 10. The polling is performed in such a manner that the multiple MFPs 32 each access a predetermined storage area at regular intervals, such as a folder provided for the corresponding MFP 32 in the apparatus management server 10, that is, in the instruction keeping unit 12. The polling processing unit 321 in this exemplary embodiment has a function of accessing the instruction keeping unit 12, for example, once a day at a scheduled time. At the scheduled time, the polling processing unit 321 automatically performs the polling unless otherwise an instruction is particularly given. In this exemplary embodiment, the polling performed at the scheduled time is referred to as regular polling.

If the instruction information extracted by the polling processing unit 321 is information regarding an instruction to start using a service (use-start instruction information), the registration requesting unit 322 refers to the information set in the use-start instruction information and thereby requests the service server 20 to register the information to permit the start of using the service.

The polling processing unit 321 and the registration requesting unit 322 of each MFP 32 are implemented by cooperative operations between the computer included in the MFP 32 and a program run by the CPU included in the computer.

The programs used in this exemplary embodiment may be provided not only by a communication medium but also in such a manner as to be stored in a computer readable recording medium such as a compact disc (CD)-ROM or a universal serial bus (USB) memory. The programs provided using the communication medium or the recording medium are installed in the computer, and various processes are executed in such a manner that the CPU of the computer runs the programs serially.

If the customer 3 intends to cause at least one of the held MFPs 32 to newly use a service not used at present, the customer 3 applies to the service server 20 for the start of using the service. If communications with the MFP 32 may be started from the apparatus management server 10 and the service server 20, the apparatus management server 10 and the service server 20 may directly access the MFP 32 and then perform a setting operation for starting using the service. However, there is a system environment in which communications with the MFP 32 are not allowed to be started from the apparatus management server 10 and the service server 20. For example, communications with the system of the customer 3 are possibly not allowed to be started from the apparatus management server 10 and the service server 20, depending on a hardware environment such as a firewall configured at the entrance of the network of the system of the customer 3 or a software environment such as restraint according to a contract or the like with the customer 3. The service system in this exemplary embodiment applies to a system in the environment hindering the communications with the system of the customer 3 from being started from the apparatus management server 10 and the service server 20.

In this exemplary embodiment, the apparatus management server 10 may give an instruction to each MFP 32 by causing the MFP 32 to perform polling. Hence, in this exemplary embodiment, effectively using the polling function may lead to registration of information required to use a service in the service server 20 without causing the administrator to operate each MFP 32. The MFP 32 thereby may newly start using the service without any operation by the administrator. Hereinafter, a process for causing the MFP 32 to newly start using a service in this exemplary embodiment will be described by using the sequence diagrams respectively illustrated in FIGS. 5A and 5B.

First, the MFP 32 performs polling regularly and thus verifies whether instruction information is registered in the predetermined storage area assigned to the MFP 32 (step S321). In this exemplary embodiment, the MFP 32 performs polling, for example, once a day at a scheduled time.

If the customer 3 intends to cause the MFP 32 to newly start using a service not used at present of the services provided by the service server 20, the administrator applies to the service server 20 for the start of using the service by operating a predetermined operation on a predetermined application screen displayed on the administrator terminal 31. The service applying unit 311 of the administrator terminal 31 transmits use-start application information including the customer ID for identifying the administrator terminal 31 and the service ID of the service intended for the use start to the service server 20 in response to the predetermined operation by the administrator (step S311).

If the service server 20 provides only one service, the service ID does not need to be included in the use-start application information. The description herein assumes that the administrator terminal 31 knows the service ID in advance; however, if the administrator terminal 31 does not know the service ID in advance, for example, the service server 20 may provide the administrator terminal 31 with a list of services provided by the service server 20 or a list of services not used by the customer 3 at present in response to the application from the customer 3 and thus may cause the administrator to select the service intended for the use start from the list. For convenience of explanation, the following description assumes that the administrator selects only one service. If the administrator selects multiple services, the process described below may be executed for each service.

In the service server 20, in response to the service ID of the service that is transmitted from the administrator terminal 31, the application receiving processing unit 21 refers to the applied-model information memory 24 and selects one or more models to which the service is applicable (step S201). The application receiving processing unit 21 then transmits, to the apparatus management server 10, a MFP list acquisition request including each selected model and the customer ID received by the application receiving processing unit 21 (step S202).

In the apparatus management server 10, the instruction registration processing unit 11 refers to the held-apparatus information DB 13 and extracts any MFP 32 associated with the transmitted customer ID and held by the customer 3. However, since the applied model for the service is transmitted together with the customer ID in this exemplary embodiment, the instruction registration processing unit 11 refers to the held-apparatus information DB 13, selects one or more MFPs 32 of the applied model for the service from among the MFPs 32 associated with the customer ID and held by the customer 3, generates the list of the MFPs 32 to which the service is applicable (step S101), and transmits the list of the MFPs 32 to the service server 20 (step S102).

In the service server 20, after the list of the MFPs 32 is transmitted from the apparatus management server 10 in response to the MFP list acquisition request, the application receiving processing unit 21 transmits the list of the MFPs 32 to the administrator terminal 31 (step S203).

As descried above, the apparatus management server 10 and the service server 20 work in cooperation with each other. One or more models permitted to use the service are identified by referring to the held-apparatus information in response to the service use application from the customer 3, and the MFP list is generated by extracting the MFPs 32 of any identified model from the multiple MFPs 32 held by the customer 3.

After the list of the MFPs 32 is transmitted from the service server 20, the service applying unit 311 of the administrator terminal 31 displays the list on the screen (step S312). After the administrator selects one or more MFPs 32 intended for the use start from the list, the service applying unit 311 transmits, to the service server 20, the apparatus ID of each MFP 32 selected by the administrator (step S313).

In this exemplary embodiment, service applicability of the MFP 32 is verified, and further the administrator selects the MFP 32 intended for the service use start. However, if the administrator applies for the service use in step S311 after the MFPs 32 are narrowed down to the MFPs 32 intended for the service use start or the models of the MFPs 32 in advance in consideration of the service applicability or the like, steps S201 to S313 may be omitted appropriately. Alternatively, if the apparatus ID or the model ID is not specified in step S311, the apparatus management server 10 and the service server 20 may consider that all of the MFPs 32 held by the customer 3 are specified as a target for the service use start and then may perform the processing.

After the MFP 32 intended for the service use start is identified, the application receiving processing unit 21 of the service server 20 generates apparatus registration information required to start using the service (step S204). Specifically, the application receiving processing unit 21 generates the apparatus registration information including a uniform resource locator (URL) for information registration and a registration code. As to be described later in detail, the URL is used when information is registered for a MFP 32 in the service server 20, and selecting the URL leads to the execution of a process for registering the MFP 32 in the used-service information DB 25. In this exemplary embodiment, the service intended for the use start by the customer 3 may be identified from the description for the URL. The registration code corresponds to an identification code of the use-start instruction information registered in the instruction keeping unit 12 and is used to prove that the MFP 32 requesting the information registration is appropriate from the security viewpoint. The application receiving processing unit 21 gives a service-use start instruction by transmitting application information to the apparatus management server 10. The application information includes, the customer ID included in the use-start application information, the apparatus ID of the MFP 32 intended for the service use start, and the apparatus registration information (step S205). The application receiving processing unit 21 temporarily keeps the application information in the application information keeping unit 23 (step S206).

In the apparatus management server 10, in response to the instruction from the service server 20, the instruction registration processing unit 11 generates use-start instruction information including the apparatus registration information as use start information on the basis of the transmitted application information and registers the use-start instruction information in the instruction keeping unit 12 (step S103).

FIG. 6 is a table illustrating an example data structure of instruction information kept in the instruction keeping unit 12 in this exemplary embodiment. The instruction information is generated for each MFP 32 and stored in the predetermined storage area prepared for the MFP 32. The apparatus management server 10 may give an instruction to the MFP 32 after storing instruction information in the predetermined storage area. The instruction information has an apparatus ID, an instruction, a URL, and a registration code that are set therein. As the apparatus ID, the apparatus ID of the instruction target MFP 32 is set. As the instruction, the content of the instruction to the MFP 32 is set. From REGISTER APPARATUS set in INSTRUCTION in the setting example in FIG. 6, it is understood that any instruction information illustrated in FIG. 6 corresponds to the use-start instruction information. URL represents information required to execute a predetermined process in accordance with the content of the instruction. As URL and REGISTRATION CODE, the URL and the registration code set in the apparatus registration information transmitted from the service server 20 are respectively set. The use-start instruction information needs to include at least the apparatus registration information. The instruction information may be composed of data items in accordance with the content of the instruction (also referred to as the type of the instruction). However, the data item INSTRUCTION is required to be set in every instruction information to identify the type of the instruction.

As described above, the use-start instruction information required to start using the service is set in the instruction keeping unit 12. The polling processing unit 321 of the MFP 32 performs polling regularly as described above (step S321) and acquires instruction information by the polling performed immediately after the information setting in step S103 (step S322). After being acquired by the polling processing unit 321, the instruction information is deleted by the MFP 32 or the apparatus management server 10. Alternatively, the instruction information is stored with information added thereto, the information indicating that the instruction information is acquired (for example, flag information or acquisition date information).

If the instruction information acquired by the polling processing unit 321 is use-start instruction information, the registration requesting unit 322 selects the URL set in the use-start instruction information. Selecting the URL corresponds to requesting information registration (step S323). In more detailed description, selecting the URL causes the launch of a program stored in the URL, and the information registration process for the service is thereby executed.

In the service server 20, the used-service registration processing unit 22 collates the pair of the apparatus ID and the registration code added to the request with the application information temporarily kept in the application information keeping unit 23 in step S206, in response to the information registration request from the MFP 32 (step S207). If the collation verifies that the MFP 32 having requested the information registration is not invalid, the used-service registration processing unit 22 registers the MFP having requested the information registration in the used-service information DB 25 in such a manner as to relate the service to the apparatus ID of the MFP 32 (step S208). Specifically, the used-service registration processing unit 22 registers the information regarding the MFP 32 in the used-service information DB 25 only if the following conditions are satisfied:

the apparatus IDs match; a registration code is specified in the information registration request; and the registration code matches the registration code included in the application information. The application information temporarily kept in the application information keeping unit 23 may be deleted after being used for the collation.

After registering the MFP 32 in relation to the service intended to be used by the MFP 32 in response to the request from the MFP 32, the used-service registration processing unit 22 notifies the administrator terminal 31 having applied for the service use of the registration completion (step S209).

When receiving the information registration request from the MFP 32 that is transmitted in response to the MFP 32 selecting the URL, the used-service registration processing unit 22 in this exemplary embodiment thereby recognizes that the MFP 32 has referred to the apparatus registration information. However, the recognition method is not limited to this. The used-service registration processing unit 22 may be configured to recognize that the MFP 32 has referred to the apparatus registration information, by using a different method, for example, by receiving a notification using a tool such as an e-mail from the MFP 32.

Relating the service to the MFP 32 as described above enables the MFP 32 to start using the service. Each MFP 32 may set itself in a state where the service is available by performing the steps in the sequence diagram illustrated in FIGS. 5A and 5B. The administrator applies for the service use from the administrator terminal 31 as in the related art before the service becomes available but does not have to move to the place where the MFP 32 is installed to make the service available.

Exemplary Embodiment 2

Figure 7:
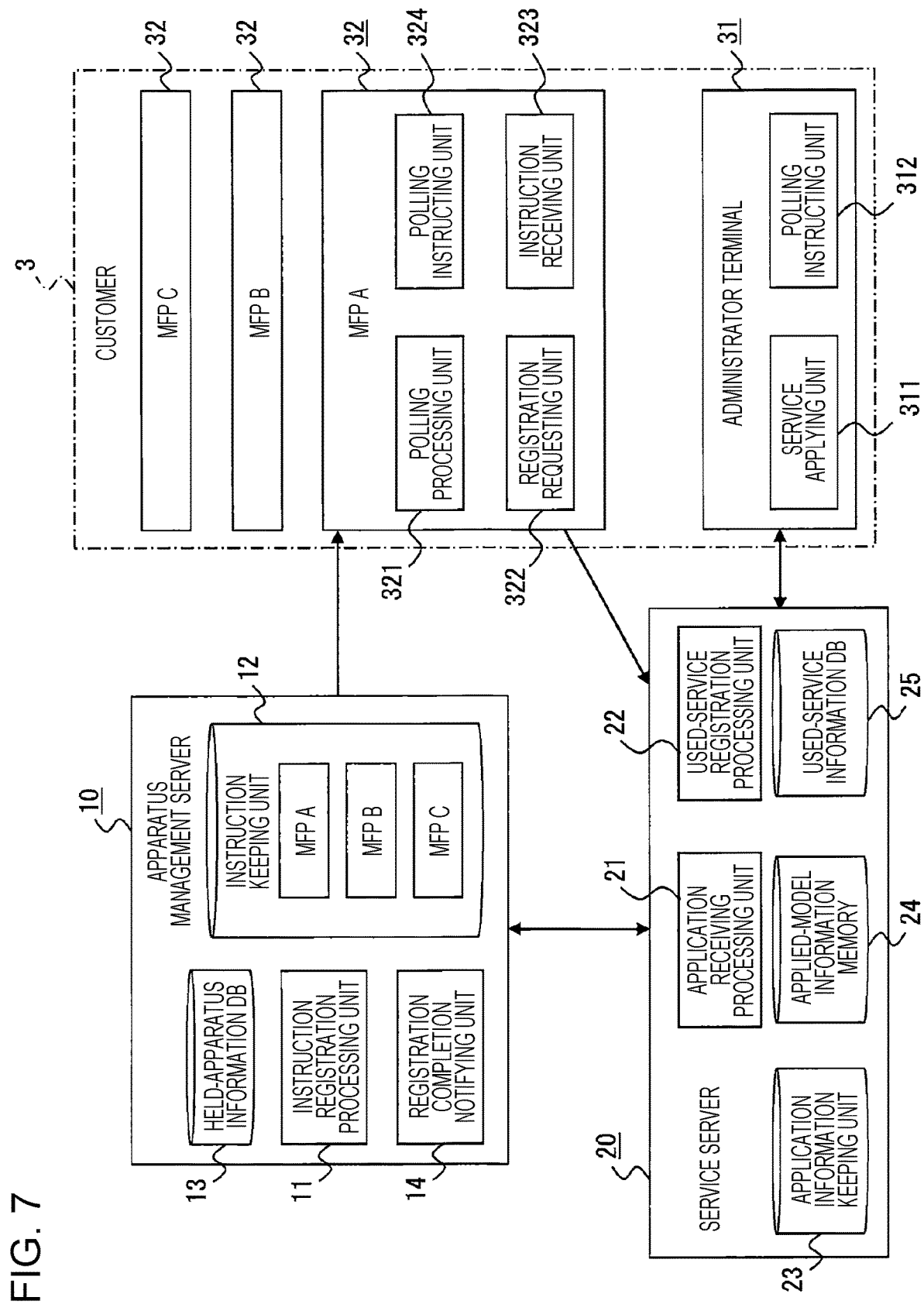
FIG. 7 is a block diagram illustrating the configuration of a service system in Exemplary Embodiment 2.

FIG. 7 is a block diagram illustrating the configuration of a service system in this exemplary embodiment. The same components as those in the system configuration illustrated in FIG. 1 are denoted by the same reference numerals, and description thereof is omitted appropriately. The apparatus management server 10 in this exemplary embodiment has a configuration in which a registration completion notifying unit 14 is added to the configuration in Exemplary Embodiment 1. The registration completion notifying unit 14 notifies the service server 20 that the instruction registration processing unit 11 registers instruction information in the instruction keeping unit 12. The registration completion notifying unit 14 is implemented by cooperative operations between a computer configured as the apparatus management server 10 and a program run by the CPU included in the computer.

In the service server 20, the used-service registration processing unit 22 performs steps only slightly different from those in Exemplary Embodiment 1; however, the service server 20 may have the same components as those in Exemplary Embodiment 1.

The administrator terminal 31 includes a polling instructing unit 312 that instructs each MFP 32 to perform polling. The polling instructing unit 312 is implemented by cooperative operations between a computer configured as the administrator terminal 31 and a program run by the CPU included in the computer.

The MFP 32 has a configuration in which an instruction receiving unit 323 and a polling instructing unit 324 are added to the configuration in Exemplary Embodiment 1. Although FIG. 7 illustrates only the MFP A has the added components, the MFPs B and C also have the same configuration. The instruction receiving unit 323 receives a polling instruction transmitted from the administrator terminal 31. In response to the polling instruction received by the instruction receiving unit 323, the polling instructing unit 324 instructs the polling processing unit 321 of the MFP 32 to perform polling to the apparatus management server 10. The instruction receiving unit 323 and the polling instructing unit 324 of the MFP 32 are implemented by cooperative operations between the computer included in the MFP 32 and a program run by the CPU included in the computer.

In Exemplary Embodiment 1 above, after the instruction information is registered in the instruction keeping unit 12, the MFP 32 may acquire the registered instruction information by regular polling performed by the polling processing unit 321 immediately after the registration of the instruction information. However, if the regular polling is performed, for example, once a day at a scheduled time, and if the instruction information is registered in the instruction keeping unit 12 shortly after the regular polling, there is a possibility that the MFP 32 is stopped from starting using the service almost a whole day.

In this exemplary embodiment, to avoid the situation as described above, the polling processing unit 321 performs the polling at timing other than the regular polling timing, and the service use may be started soon after the registration of the instruction information.

A process for causing the MFP 32 to start using a new service in this exemplary embodiment will be described by using a sequence diagram illustrated in FIG. 8.

Figure 5A:
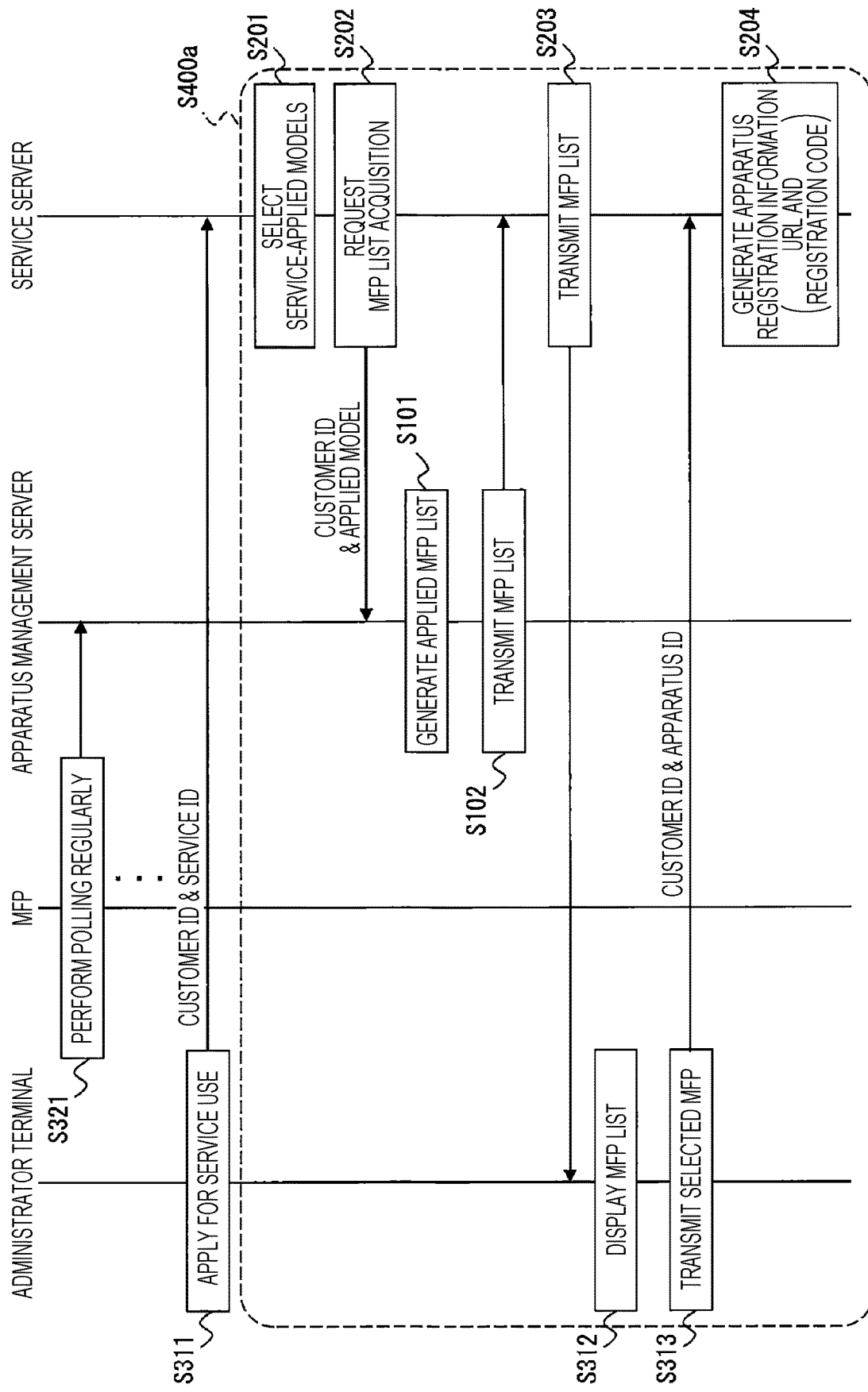
FIG. 5A is a sequence diagram illustrating a process for causing a MFP to start using a new service in Exemplary Embodiment 1.
Figure 5B:
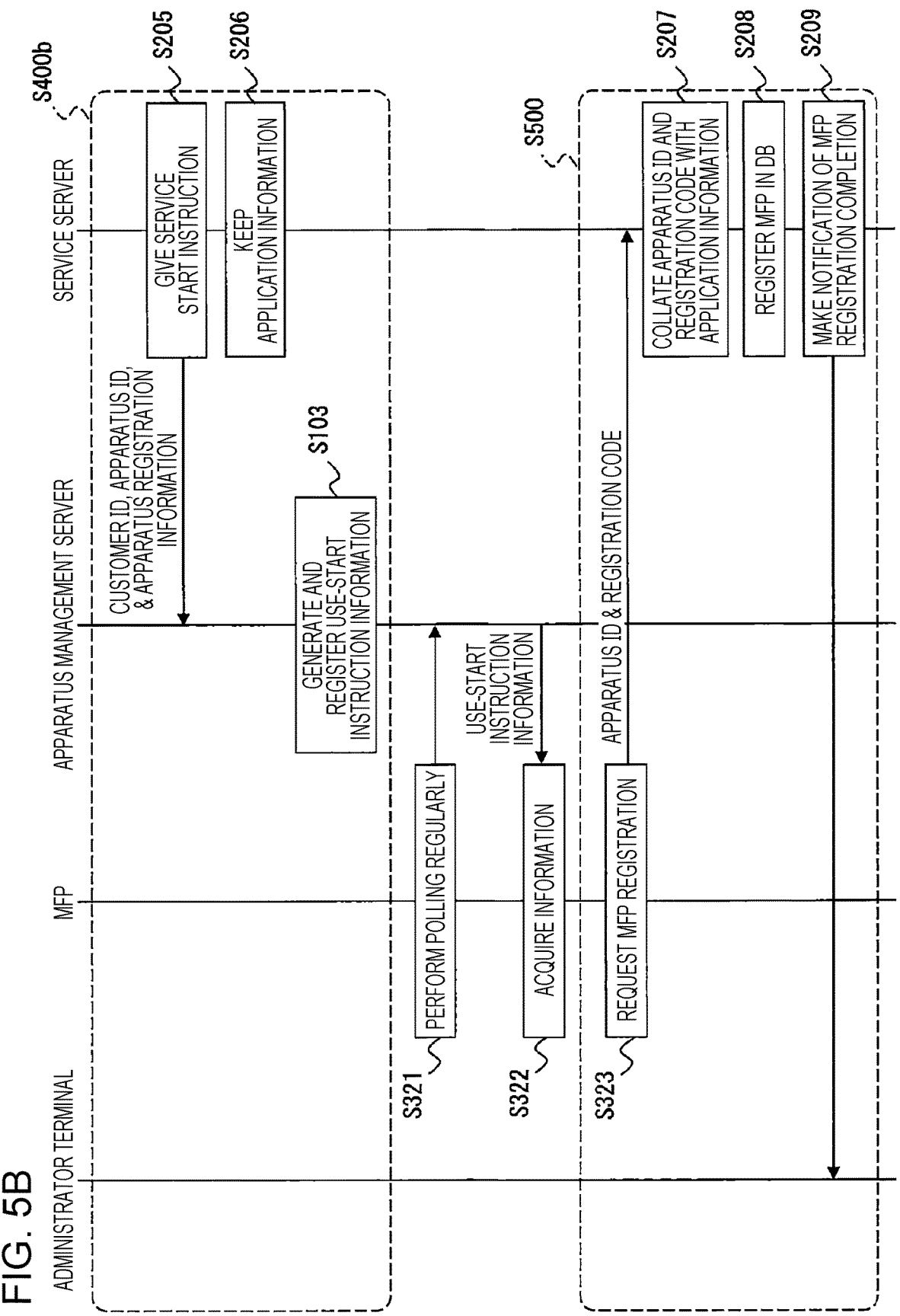
FIG. 5B is a sequence diagram following FIG. 5A.

Processes surrounded by broken lines in FIGS. 5A and 5B that are specifically a use-start instruction information registration process (steps S400*a* and S400*b*) and a MFP registration process (step S500) may be the same as those in Exemplary Embodiment 1. The use-start instruction information registration process is executed until the use-start instruction information is registered in the instruction keeping unit 12 after the service server 20 receives the service use application from the administrator terminal 31. The MFP registration process is executed until the MFP 32 intended for the service use start is registered in the service server 20 after the MFP 32 acquires the use-start instruction information from the instruction keeping unit 12. In this exemplary embodiment, the illustration of the details of the processes is thus omitted as illustrated in FIG. 8, and the description thereof is also omitted appropriately. In addition, embodiments following this exemplary embodiment requires description of the MFPs 32 distinguished from each other, and thus respective temporal axes are represented for the MFPs 32, that is, the MFPs A, B, and C. The description assumes that the MFPs A, B, and C are each selected as a service-use start target.

In step S400*b*, the instruction registration processing unit 11 registers the use-start instruction information in the instruction keeping unit 12. The registration completion notifying unit 14 then notifies the service server 20 that the instruction registration processing unit 11 registers the use-start instruction information in the in the instruction keeping unit 12 (step S121). When notifying the service server 20 of the registration in the instruction keeping unit 12, the registration completion notifying unit 14 may add, to the notification, information (that is, an apparatus ID) identifying a MFP 32 serving as a target for registering the use-start instruction information among the MFPs 32 held by the customer 3.

In response to the service use application from the administrator terminal 31, the application receiving processing unit 21 of the service server 20 notifies the administrator terminal 31 that the information transmitted from the apparatus management server 10 is registered (step S221).

After the administrator terminal 31 receives the registration notification transmitted from the service server 20, the application receiving processing unit 21 displays the notification on the screen of the administrator terminal 31. The administrator thereby knows that the service use may be started.

The administrator then performs a predetermined operation on a predetermined instruction screen at an intended time, and thereby the polling instructing unit 312 is started. Upon being started, the polling instructing unit 312 instructs the MFPs A, B, and C each serving as the service-use start target to perform polling (step S314). If a MFP 32 is not selected as the service-use start target, the polling instructing unit 312 does not instruct the MFP 32 to perform the polling.

In response to receiving the polling instruction transmitted from the administrator terminal 31, the instruction receiving unit 323 of the MFP A instructs the polling instructing unit 324 to perform the polling. In accordance with the instruction from the instruction receiving unit 323, the polling instructing unit 324 instructs the polling processing unit 321 to perform the polling. This causes the polling processing unit 321 to perform the polling even if the current time does not reach the scheduled time for the regular polling (step S324).

As described above, the polling processing unit 321 acquires the instruction information by extracting the instruction information from the instruction keeping unit 12 in accordance with the instruction from the administrator (step S322). The following MFP registration process (step S500) is the same as that in Exemplary Embodiment 1, and thus the description thereof is omitted.

The other MFPs B and C also perform the same steps as those by the MFP A to perform the polling (step S324) and then acquire the instruction information (step S322).

Note that the polling instruction given by the polling instructing unit 312 to the MFPs A, B, and C in step S314 is the same as an instruction-information acquisition request from the apparatus management server 10. If the polling instructing unit 312 gives an instruction to transmit the instruction-information acquisition request almost simultaneously without any time interval, the MFPs A, B, and C are likely to access the apparatus management server 10 at the same time. In other words, there is a possibility that the polling by the MFPs A, B, and C is not achieved. To avoid this, the polling instructing unit 312 may be configured to give the polling instruction to the MFPs A, B, and C at respective different timings in step S324. Specifically, the polling instructing unit 312 transmits the instruction-information acquisition request to the MFPs A, B, and C at a predetermined time interval, and thereby the polling may be achieved. Alternatively, the polling instructing unit 312 may add time information indicating the polling timing to the polling instruction to the MFPs A, B, and C. The instruction given to the MFPs A, B, and C is also applicable to exemplary embodiments to be described later.

According to this exemplary embodiment as described above, the information regarding a MFP 32 may be registered in the service server 20 without waiting for the timing for the regular polling, and thus the service use may be started earlier than in the case where only the regular polling is performed.

Exemplary Embodiment 3

In Exemplary Embodiment 2 above, the service use may be started without waiting for the timing for the regular polling. However, suppose a case where the apparatus ID of the MFP 32 serving as the target for registering the use-start instruction information, in other words, the MFP 32 intended for the service use start is not added to the notification transmitted from the service server 20 and indicating that the use-start instruction information is registered in the instruction keeping unit 12. In this case, it is not possible for the administrator in the customer 3 to identify the MFP 32 intended for the service use start, and thus the administrator makes an effort to find the MFP 32. Even if the apparatus ID of the MFP 32 is added to the notification of the registration in the instruction keeping unit 12, it is not possible for the administrator or the polling instructing unit 312 started by the administrator to decide the content of the instruction to the MFP 32 in some cases.

In this exemplary embodiment, for convenience for the administrator, the apparatus management server 10 provides the administrator with information.

The system configuration in this exemplary embodiment may be the same as in Exemplary Embodiment 2. However, the data structure of the held-apparatus information stored in the held-apparatus information DB 13 is different from that in Exemplary Embodiments 1 and 2.

FIG. 9 is a table illustrating an example data structure of the held-apparatus information stored in the held-apparatus information DB 13 in this exemplary embodiment. In the held-apparatus information in this exemplary embodiment, the customer ID is associated with address information in addition to the model ID and the apparatus ID. The address information is information uniquely identifying the MFP 32 and required to access the MFP 32. For example, an IP address assigned to the MFP 32 or a fully qualified domain name (FQDN) is set as the address information.

A process for causing each MFP 32 to start using a new service in this exemplary embodiment will be described by using a sequence diagram illustrated in FIG. 10.

Figure 8:
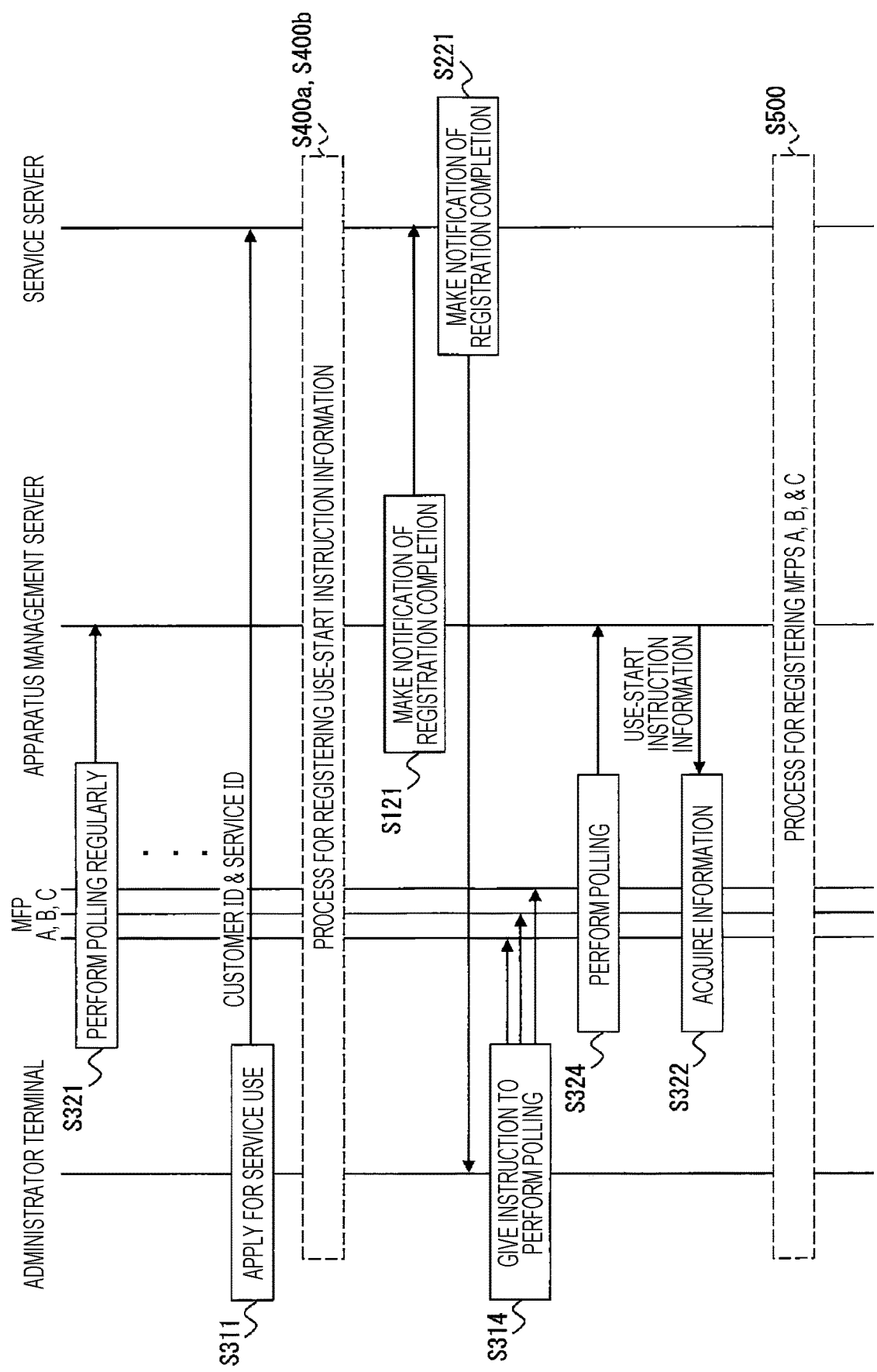
FIG. 8 is a sequence diagram illustrating a process for causing a MFP to start using a new service in Exemplary Embodiment 2.

In this exemplary embodiment, basically the same process as that in FIG. 8 in Exemplary Embodiment 2 may be performed. However, in this exemplary embodiment, after the instruction registration processing unit 11 registers the use-start instruction information in the instruction keeping unit 12 in step S400b, the registration completion notifying unit 14 notifies the service server 20 that the instruction registration processing unit 11 registers the use-start instruction information in the instruction keeping unit 12 (step S131) with acquisition instruction information added to the notification. The acquisition instruction information is information for causing the administrator in the customer 3 to instruct each of the MFPs 32 held by the customer 3, in a stricter explanation, the MFP 32 serving as the service-use start target to acquire use start information.

The registration completion notifying unit 14 in this exemplary embodiment generates the acquisition instruction information in a URL format, for example, "https://MFP 32 address information/doPolling". The URL corresponds to a command to cause a MFP 32 applying to "MFP 32 address information" to perform polling, that is, "doPolling". In the settings example of the held-apparatus information illustrated in in FIG. 9, the registration completion notifying unit 14 generates pieces of acquisition instruction information for the respective MFPs 32 A, B, and C of the customer 3 having the customer ID "C001". The pieces of acquisition instruction information respectively include URLs https://111.222.111.1/doPolling, https://111.222.111.2/doPolling, and "https://111.222.111.3/doPolling".

In response to the service use application from the administrator terminal 31, the application receiving processing unit 21 of the service server 20 transmits, to the administrator terminal 31, the notification of the registration in the instruction keeping unit 12 that is transmitted from the apparatus management server 10 and thereby notifies the administrator terminal 31 of the registration (step S231).

After the administrator terminal 31 receives the notification of the registration in the instruction keeping unit 12 transmitted from the service server 20, the application receiving processing unit 21 displays the notification on the screen of the administrator terminal 31. The administrator thereby knows that the service use may be started.

Further, the pieces of acquisition instruction information to the MFPs A, B, and C added to the notification of the registration in the instruction keeping unit 12 are selectably displayed on the screen of the administrator terminal 31. The administrator may thus instruct an appropriate one of the MFPs 32 to perform the polling by simply selecting a URL for a corresponding one of the MFPs A, B, and C. That is, the administrator may simply select one of the URLs without the need for finding the service-use start target MFP 32. The polling instructing unit 312 is started in response to the selection operation of the URL and instructs the MFP 32 associated with the URL selected by the administrator to perform the polling (step S315).

The subsequent steps are the same as those in Exemplary Embodiment 2, and thus the description thereof is omitted. In this exemplary embodiment, by simply selecting a URL displayed on the screen, the administrator may instruct the service-use start target MFP 32 to perform the polling, that is, to request the instruction-information acquisition from the apparatus management server 10.

In this exemplary embodiment, in response to the service use application from the administrator terminal 31 (step S311), the apparatus management server 10 transmits the registration completion notification to the administrator terminal 31 via the service server 20 after adding the acquisition instruction information to the registration completion notification (steps S131 and S231). However, the apparatus management server 10 may transmit the registration completion notification directly to the administrator terminal 31, wherever possible.

Exemplary Embodiment 4

In Exemplary Embodiment 3 above, the administrator may cause the service-use start target MFP 32 to start using a service by simply specifying a URL. However, if there are a large number of MFPs 32 intended for the service use start, URL selection operations are required to be performed as many times as the number of MFPs 32.

In this exemplary embodiment, when the administrator simply selects only one URL, all of the service-use start target MFPs 32 may thereby be caused to start using a service.

Figure 11A:
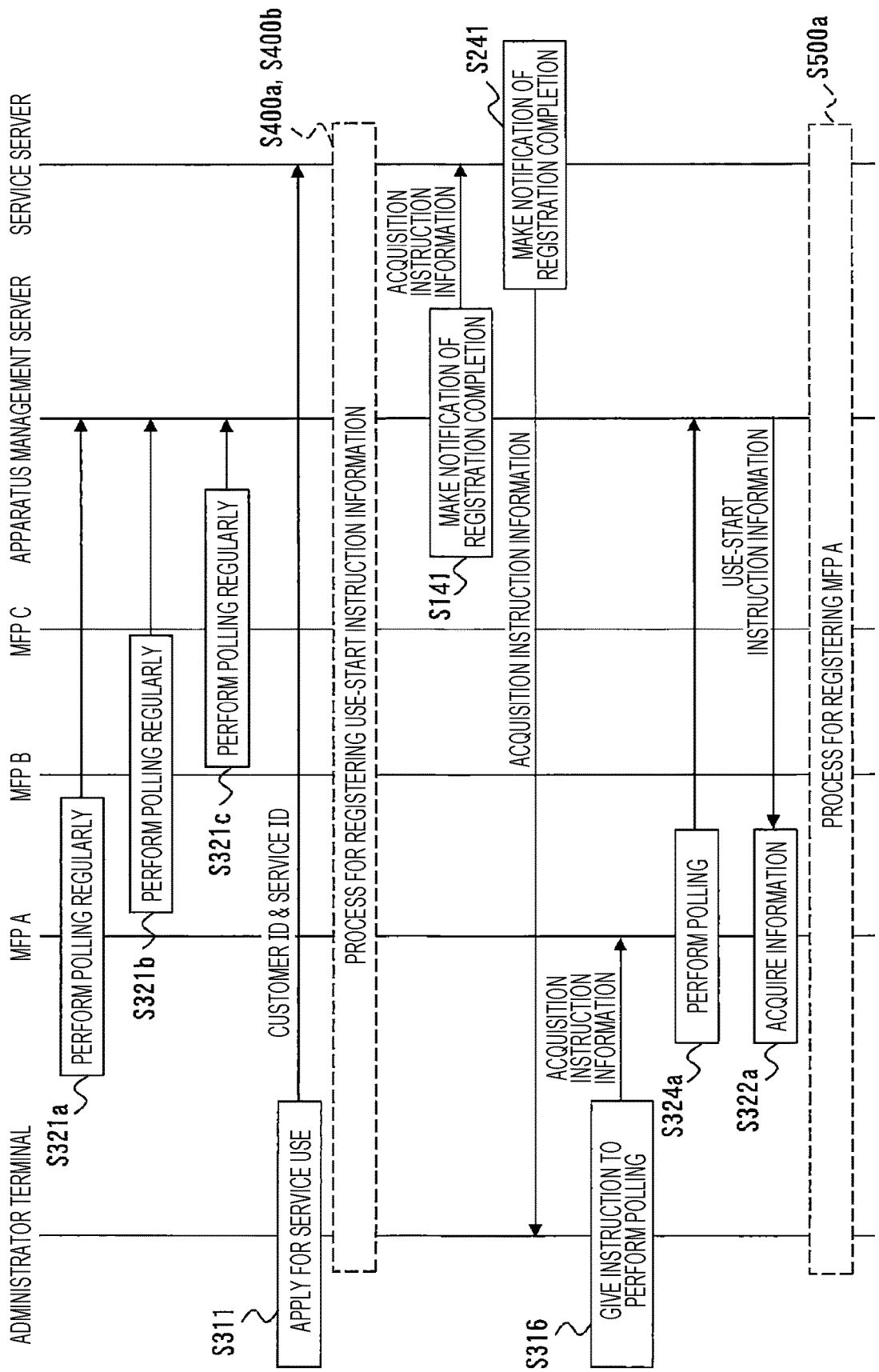
FIG. 11A is a sequence diagram illustrating a process for causing a MFP to start using a new service in Exemplary Embodiment 4.
Figure 11B:
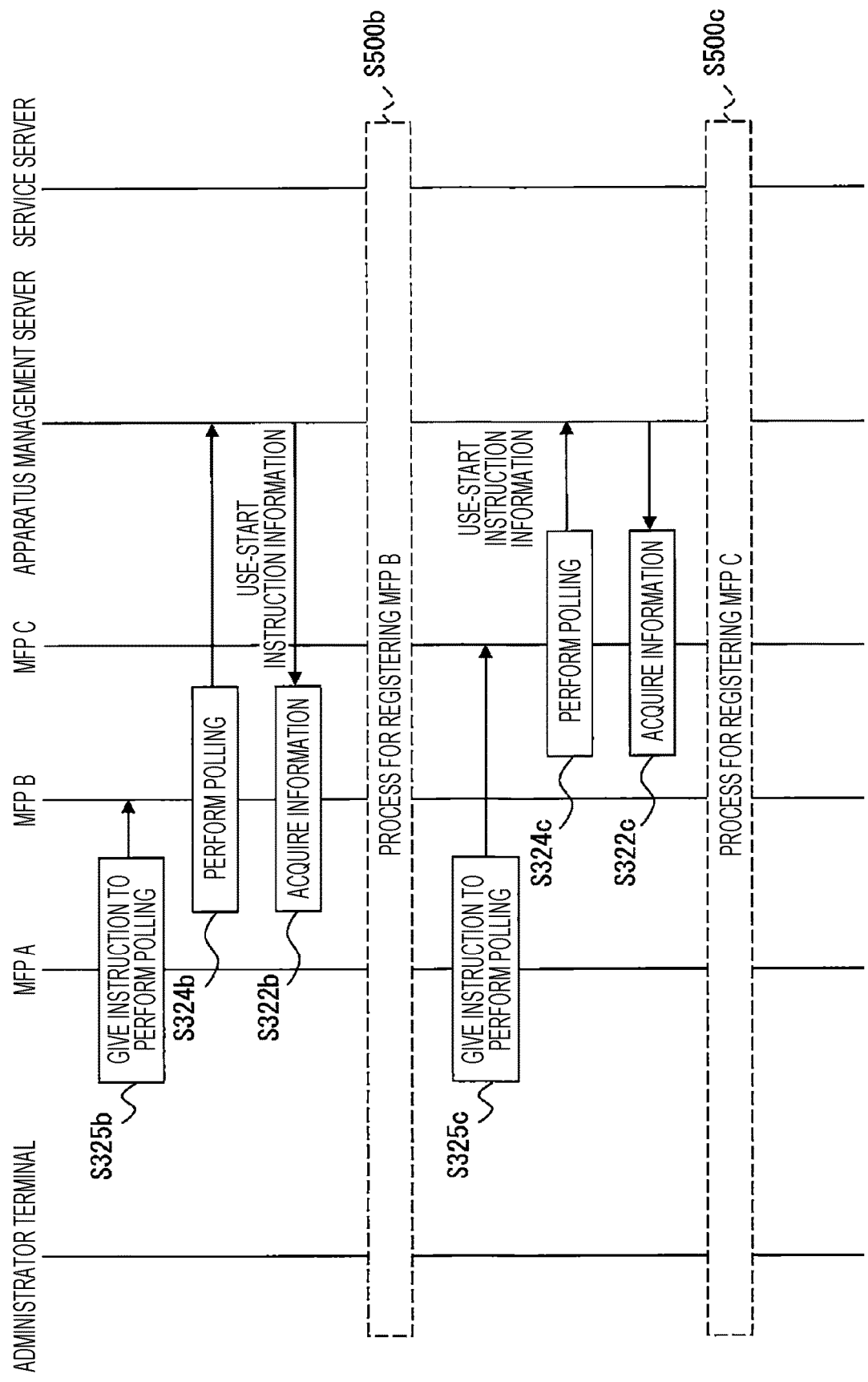
FIG. 11B is a sequence diagram following FIG. 11A.

The system configuration in this exemplary embodiment may be the same as the system configuration in Exemplary Embodiments 2 and 3 illustrated in FIG. 7. However, the content of the acquisition instruction information added to the registration completion notification by the registration completion notifying unit 14 is different from that in Exemplary Embodiment 3. Hereinafter, a process for causing the MFPs 32 to start using a new service in this exemplary embodiment will be described by using sequence diagrams illustrated in FIGS. 11A and 11B.

Figure 10:
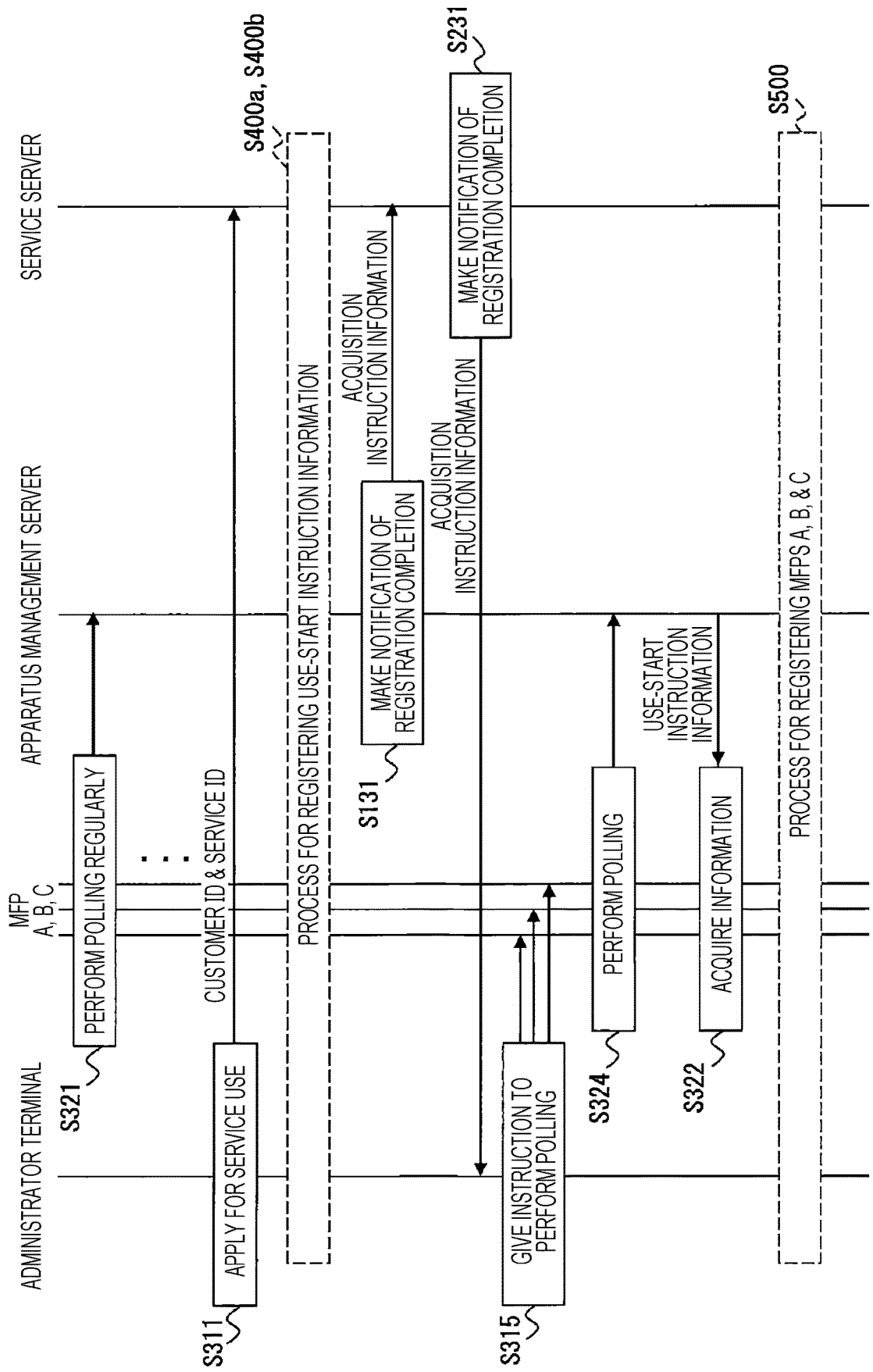
FIG. 10 is a sequence diagram illustrating a process for causing a MFP to start using a new service in Exemplary Embodiment 3.

In this exemplary embodiment, basically the same process as that in FIG. 10 in Exemplary Embodiment 3 may be performed. However, in this exemplary embodiment, after the instruction registration processing unit 11 registers the use-start instruction information in the instruction keeping unit 12 in step S400b, the registration completion notifying unit 14 notifies the service server 20 that the instruction registration processing unit 11 registers the use-start instruction information in the instruction keeping unit 12, with the acquisition instruction information added to the notification (step S141). However, the acquisition instruction information added to the notification of the registration in the instruction keeping unit 12 has content different from that in Exemplary Embodiment 3 above.

The registration completion notifying unit 14 in this exemplary embodiment generates the acquisition instruction information in a URL format, for example, "https://MFP 32 address information/doPolling/?pollreq=address information of polling instruction target MFP 32". The URL corresponds to a command to cause a MFP 32 applying to "MFP 32 address information" to perform polling, that is, "doPolling" and also cause a MFP 32 following "?pollreq=" and specified its address information to perform polling. In the settings example of the held-apparatus information illustrated in FIG. 9, the registration completion notifying unit 14 generates acquisition instruction information including the URL "https://111.222.111.1/doPolling/?pollreq=111.222.111.2, 111.222.111.3" for the MFP A specified using "MFP 32 address information" among the MFPs 32 of the customer 3 having the customer ID "C001". In this exemplary embodiment, the MFP 32 is selected in accordance with a selection criterion in which the address information of the MFP 32 that appears first in the pieces of held-apparatus information having the same customer 3 is set as "MFP 32 address information"; however, a MFP 32 to be set for "MFP 32 address information" serving as the polling instruction target may be selected in accordance with a different selection criterion, for example, a MFP 32 of the highest performance model is selected.

The application receiving processing unit 21 of the service server 20 notifies the administrator terminal 31 of the registration in the instruction keeping unit 12 transmitted from the apparatus management server 10 (step S241).

After the administrator terminal 31 receives the notification of the registration in the instruction keeping unit 12 transmitted from the service server 20 in response to the service use application, the application receiving processing unit 21 displays the notification on the screen of the administrator terminal 31. The administrator thereby knows that the service use may be started.

Further, the pieces of acquisition instruction information (that is, the URLs) are selectably displayed on the screen of the administrator terminal 31, and thus the administrator selects a URL at an intended timing. The polling instructing unit 312 is started in response to the administrator selecting the URL and instructs the MFP A to perform the polling (step S316). The MFP A has the address information set in "MFP 32 address information" indicating the URL selected by the administrator.

The instruction receiving unit 323 of the MFP A receives the polling instruction transmitted from the administrator terminal 31, that is, the URL selected by the administrator. After receiving the URL received by the instruction receiving unit 323, the polling instructing unit 324 instructs the polling processing unit 321 of the MFP 32 to perform the polling in accordance with the command specified in the URL. This causes the polling processing unit 321 to perform the polling even if the current time does not reach the scheduled time for the regular polling (step S324a). The MFP A may thereby acquire the use-start instruction information from the apparatus management server 10 (step S322a) and then executes the information registration process for the MFP A on the basis of the acquired use-start instruction information (step S500a).

The polling instructing unit 324 of the MFP A then instructs the MFPs B and C to perform the polling (step S325b and S325c). The MFPs B and C have address information specified subsequently to the command specified in the URL, specifically "?pollreq=".

First, the instruction receiving unit 323 of the MFP B receives the polling instruction transmitted from the MFP A, and thereafter the polling instructing unit 324 of the MFP B instructs the polling processing unit 321 of the MFP B to perform the polling in accordance with the command received by the instruction receiving unit 323. This causes the polling processing unit 321 to perform the polling even if the current time does not reach the scheduled time for the regular polling (step S324b). The MFP B may thereby acquire the use-start instruction information from the apparatus management server 10 (step S322b) and then executes the information registration process for the MFP B on the basis of the acquired use-start instruction information (step S500b).

Like the MFP B, MFP C also performs the polling in accordance with the instruction from the MFP A (step S324c) and thereby executes the information registration process for the MFP C on the basis of the acquired use-start instruction information (steps S322c and S500c).

According to this exemplary embodiment, the administrator terminal 31 acquires the acquisition instruction information by which the apparatus management server 10 causes the MFP A to instruct the other MFPs B and C to perform the polling and thus may give the polling instruction only to the MFP A.

According to this exemplary embodiment as described above, the acquisition instruction information for causing the administrator to instruct a specific MFP 32 (the MFP A in the description above) among the MFPs 32 held by the customer 3 to acquire the use-start instruction information and for causing the MFP A to instruct the MFPs 32 (the MFPs B and C in the description above) other than the specific MFP 32 to acquire the use-start instruction information is generated and transmitted to the administrator terminal 31. The administrator may give only the MFP A an instruction to acquire the use-start instruction information for the MFPs A, B, and C.

Note that like Exemplary Embodiments 2 and 3 above, the polling instruction to each MFP 32 corresponds to the instruction information acquisition instruction from the apparatus management server 10 in a strict explanation, and thus timing at which the MFP 32 accesses the apparatus management server 10 is set in the following manner. For example, the timing at which the MFP 32 accesses the apparatus management server 10 is set in the acquisition instruction information to be transmitted to the administrator terminal 31, or timing at which the MFP A receiving the instruction from the administrator terminal 31 gives the instruction to the other MFPs B and C is controlled.

In this exemplary embodiment, the customer 3 holding the three MFPs 32 is taken as an example, and thus the administrator gives an instruction to only one MFP A to cause the MFP A to give the instructions to the other MFPs B and C. However, if there are a huge number of held MFPs 32, the MFP A is likely to have excessive burden. To avoid this, for example, the MFPs 32 may have a multi-layer structure. For example, the administrator gives an instruction only to the MFP A, the MFP A gives instructions to the MFPs B, C, and D, the MFP B gives instructions to MFPs E, F, G, and H, the MFP C gives instructions to MFPs I, J, and K, and the MFP D gives instructions to MFPs L, M, and N. Alternatively, the administrator gives instructions to the MFPs A and B the number of which is a small number. The MFPs A and B the number of which is a small number then give instructions to the MFPs 32 in the lower layer as described above.

According to this exemplary embodiment, there is no need for causing the administrator to instruct each MFP 32 to perform the polling, the processing load on the administrator to start using a service may be reduced.

In this exemplary embodiment, in response to the service use application from the administrator terminal 31 (step S311), the apparatus management server 10 transmits the registration completion notification with the acquisition instruction information added thereto to the administrator terminal 31 via the service server 20 (steps S141 and S241). However, the apparatus management server 10 may transmit the registration completion notification directly to the administrator terminal 31, wherever possible.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus from which communication with one or a plurality of apparatuses held by a user is not allowed to be started, the information processing apparatus comprising:
    a processor configured to:
        in response to application for use of a service from the user, extract the plurality of apparatuses held by the user, by referring to held-apparatus information in which the user is associated with the plurality of apparatuses held by the user;
        register use start information in a storage area provided for each of the plurality of extracted apparatuses, the use start information including at least apparatus registration information; and
        after recognizing that one of the apparatuses refers to the apparatus registration information, register an identification of the apparatus that refers to the apparatus registration information, the identification being registered in a memory storing an apparatus permitted the use of the service, the identification being registered in relation to an identification of the service.

2. The information processing apparatus according to claim 1,
    wherein the processor is configured to notify the user that the use start information is registered in the storage area.

3. The information processing apparatus according to claim 2,
    wherein the processor is configured to notify the user that the use start information is registered and of the plurality of apparatuses held by the user.

4. The information processing apparatus according to claim 2,
    wherein the processor is configured to transmit, to a terminal apparatus used by the user, acquisition instruction information for causing the user to instruct each of the plurality of apparatuses held by the user to acquire the use start information.

5. The information processing apparatus according to claim 2,
    wherein the processor is configured to transmit, to a terminal apparatus used by the user, acquisition instruction information for causing the user to instruct a specific apparatus of the plurality of apparatuses held by the user to acquire the use start information and for causing the specific apparatus to instruct an apparatus of the apparatuses that is other than the specific apparatus to acquire the use start information.

6. The information processing apparatus according to claim 1,
    wherein the held-apparatus information includes information identifying a model of each apparatus, and
    wherein the processor is configured to:
        in response to the application for the use of the service from the user, identify a model permitted the use of the service, the model being identified by referring to the held-apparatus information;

extract an apparatus of the plurality of apparatuses held by the user, the apparatus being of the identified model; and register the use start information in the storage area for the extracted apparatus.

7. The information processing apparatus according to claim 1, wherein the processor is configured to:

in response to specifying a model in the application, extract an apparatus of the plurality of apparatuses held by the user, the apparatus being of the specified model.

8. The information processing apparatus according to claim 1, wherein the processor is configured to:

present, to the user, a list of the apparatuses extracted in response to the application for the use of the service from the user; and register the use start information in the storage area for the apparatus selected by the user from the presented list.

9. The information processing apparatus according to claim 6, wherein the processor is configured to:

present, to the user, a list of the apparatuses extracted in response to the application for the use of the service from the user; and register the use start information in the storage area for the apparatus selected by the user from the presented list.

10. The information processing apparatus according to claim 7, wherein the processor is configured to:

present, to the user, a list of the apparatuses extracted in response to the application for the use of the service from the user; and register the use start information in the storage area for the apparatus selected by the user from the presented list.

11. A service system comprising:

a terminal apparatus used by a user;

a plurality of apparatuses held by the user;

an information processing apparatus that manages the apparatuses to be provided with a service and from which communication with the apparatuses is not allowed to be started; and a memory that stores an apparatus of the apparatuses that is permitted use of the service, wherein a first processor included in the terminal apparatus is configured to:

make application for the use of the service to the information processing apparatus in response to an instruction from the user, wherein a second processor included in the information processing apparatus is configured to:

in response to the application transmitted from the terminal apparatus, extract a plurality of apparatuses held by the user by referring to held-apparatus information in which the user is associated with the plurality of apparatuses held by the user; and register use start information in a storage area provided for each of the plurality of extracted apparatuses, the use start information including at least apparatus registration information, wherein third processors each included in a corresponding one of the plurality of apparatuses are each configured to:

when the use start information has been registered at a time of accessing the storage area for the apparatus, acquire the use start information; and refer to apparatus registration information included in the acquired use start information, and wherein the second processor is configured to:

register, in the memory, an identification of the apparatus having a corresponding one of the third processors that refers to the apparatus registration information, the identification being registered in relation to an identification of the service.

12. The service system according to claim 11, wherein the second processor is configured to:

register the use start information and an identification code of the use start information in the storage area; and register, in the memory, an identification of only an apparatus of the apparatuses that has the identification code specified in referring to the apparatus registration information.

13. A non-transitory computer readable medium storing a program causing, to execute a process, a computer from which communication with one or a plurality of apparatuses held by a user is not allowed to be started, the process comprising:

in response to application for use of a service from the user, extracting the plurality of apparatuses held by the user, by referring to held-apparatus information in which the user is associated with the plurality of apparatuses held by the user;

registering use start information in a storage area provided for each of the plurality of extracted apparatuses, the use start information including at least apparatus registration information; and after recognizing that one of the apparatuses refers to the apparatus registration information, registering an identification of the apparatus that refers to the apparatus registration information, the identification being registered in a memory storing an apparatus permitted the use of the service, the identification being registered in relation to an identification of the service.

* * * * *